Nov. 19, 1957   H. APPLEMAN   2,813,364
FISH FLY ACCESSORY
Filed Oct. 5, 1953
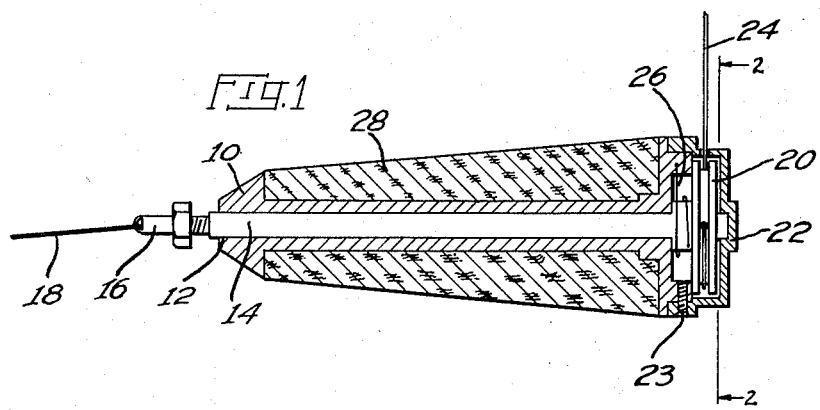
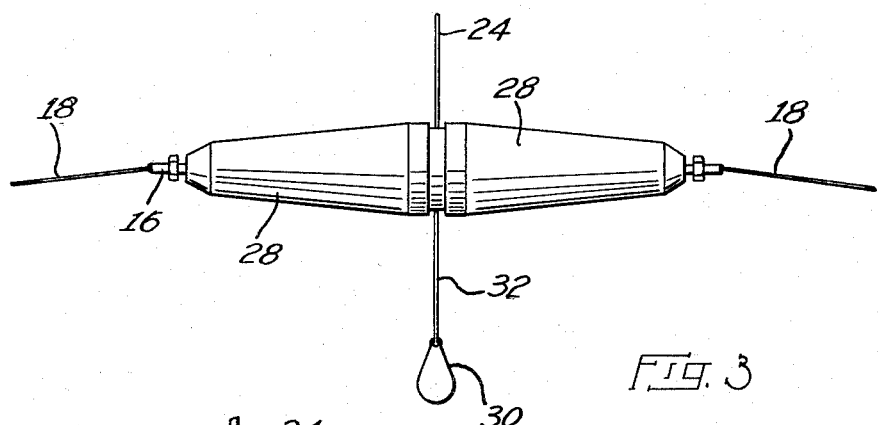
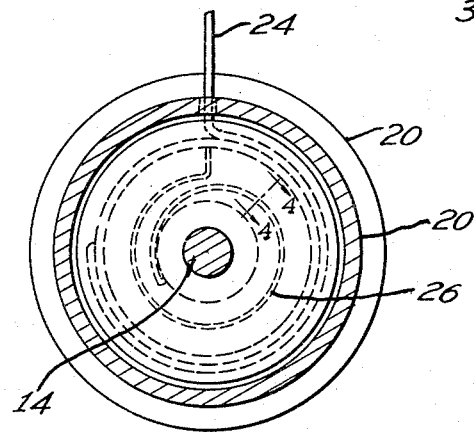
INVENTOR.
Henry Appleman
BY Joseph B. Forman

United States Patent Office 2,813,364
Patented Nov. 19, 1957

2,813,364
FISH FLY ACCESSORY

Henry Appleman, Brooklyn, N. Y.

Application October 5, 1953, Serial No. 384,301

2 Claims. (Cl. 43—19.2)

This invention relates to a fish fly accessory such as is utilized in the art of fishing.

Fishermen have from time immemorial cast about for improved devices capable of luring fish to the bait and lure. In this respect, much has been done to simulate live bait by the use of fish flys.

One of the major problems in the use of artificial flies with respect to the simulation of live bait is the absence of motion by the artificial fly. It, therefore, becomes necessary to provide a means for rotating the fly or moving the same to simulate motion.

It is a prime object of the invention to provide an improved device for rotating fish fly.

It is a further object of the invention to provide an improved mechanism for rotating flies which is economical to manufacture, positive in action, and simple in operation.

Other objects and advantages of the invention will be apparent to those skilled in the art from a reading of the following specification taken with the drawing wherein:

Figure 1 is a sectional view of the mechanism of the invention.

Figure 2 is an end sectional view taken along line 2—2 of Figure 1.

Figure 3 is a planned view of the mechanism of the invention incorporated in a multiple unit.

Referring to the drawing in detail, the invention comprises a body member 10 formed with a central bore 12. A shaft 14 extends through said bore and is provided at one end with a hook 16 to which may be attached a line 18, the other end whereof is attached to a lure or fly. Shaft 14 is provided at its other extremity with a pulley 20 which is encased in a housing formed by a portion of body member 10 and cover member 22 which is secured to body member 10 by means of a screw 23. A line 24 extends about said pulley and out of said housing for attachment to the fishing line. Shaft 14 is tensioned against circular motion by means of a flat coil spring 26. The mechanism is given buoyancy by use of a buoyant material such as balsa or light density plastic 28 and is weighted down in use by means of a weight 30 generally secured to the mechanism by means of a line of suitable length such as 32, illustrated in Figure 3. Figure 3 illustrates a dual mechanism in housing, which is actually a second shaft coupled to the first shaft, both utilizing the same pulley and tensioning the spring.

Having thus described my invention, I desire it understood that variations from the specific embodiment herein disclosed, will be obvious to those skilled in the art and I, therefore, desire that the claims appended hereto be interpreted within the spirit and scope of the invention.

What is claimed is:

1. A mechanism for fish lures comprising a body member, said body member including an end housing at one longitudinal extremity and a central bore extending through said body member and into said housing, a shaft rotatably positioned within said bore and extending into said housing, and without said bore, a line actuated pulley secured to said shaft within said housing and a spring within said housing tensioning said shaft against rotation within said bore.

2. A mechanism for fish lures comprising a body member, said body member including an end housing at one longitudinal extremity, a central bore extending through said body member and into said housing, a shaft rotatably positioned within said bore and extending into said housing and without said bore, a pulley secured to said shaft within said housing, a flat coil spring within said housing tensioning said shaft against rotation within said bore, and a line extending about said pulley and through said housing, in a direction whereby movement of said line outward of said body member effects rotation of said pulley against said spring.

References Cited in the file of this patent

UNITED STATES PATENTS

| | | |
|---|---|---|
| 1,973,028 | Thomas | Sept. 11, 1934 |
| 2,577,552 | White | Dec. 4, 1951 |